(12) United States Patent
Pelletier et al.

(10) Patent No.: US 9,140,972 B2
(45) Date of Patent: Sep. 22, 2015

(54) DISPLAY SYSTEM COMPRISING A SCREEN COMPRISING AN ARRAY OF DIFFRACTIVE PATTERNS

(71) Applicant: THALES, Neuilly sur Seine (FR)

(72) Inventors: Sebastien Pelletier, Marignac (FR); Aude Gueguen, Bordeaux (FR); Matthieu Grossetete, Cenon (FR); Jean-Luc Bardon, Martignas sur Jalle (FR); Laurent Laluque, Bordeaux (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 14/567,718

(22) Filed: Dec. 11, 2014

(65) Prior Publication Data

US 2015/0160546 A1    Jun. 11, 2015

(30) Foreign Application Priority Data

Dec. 11, 2013 (FR) ...................... 13 02895

(51) Int. Cl.
*G03B 21/60* (2014.01)
*G02B 27/01* (2006.01)

(52) U.S. Cl.
CPC ............ *G03B 21/60* (2013.01); *G02B 27/0101* (2013.01); *G02B 27/0172* (2013.01)

(58) Field of Classification Search
CPC ................. G03B 21/60; G03B 27/106; G02B 2027/0105; G02B 2027/0109; G02B 27/10; G02B 27/0101; G02B 27/0172
USPC .................................................. 359/443, 449
See application file for complete search history.

(56) References Cited

U.S. PATENT DOCUMENTS

2007/0059849 A1*   3/2007   Op de Beeck .................. 438/14
2012/0162734 A1*   6/2012   Lambert ........................ 359/13

FOREIGN PATENT DOCUMENTS

EP     2 469 324 A1    8/2012
FR     2 986 624 A1    8/2013

OTHER PUBLICATIONS

French Search Report for French Counterpart Application No. FR 13028955, 6 pgs. (Sep. 3, 2014).

* cited by examiner

*Primary Examiner* — Christ Mahoney
(74) *Attorney, Agent, or Firm* — Blakely, Sokoloff, Taylor & Zafman LLP

(57) ABSTRACT

The general field of the invention is that of display systems comprising an image projector and an associated display screen, the said display system being designed to be used by an observer situated at a given location, the said display screen comprising two transparent and substantially parallel faces, the said display screen comprising, on at least one of its transparent faces, a plurality of regularly distributed light-scattering patterns. The image projector according to the invention illuminating the screen under a plurality of angles of incidence determined by the position and the size of the display screen, the said angles of incidence being centered on a mean angle of incidence, the scattering patterns comprise a diffractive structure in order to diffract the light rays having at least the mean angle of incidence in one or more directions corresponding to the said given location of the observer.

5 Claims, 2 Drawing Sheets

DISPLAY SYSTEM COMPRISING A SCREEN COMPRISING AN ARRAY OF DIFFRACTIVE PATTERNS

BACKGROUND OF THE INVENTION

1. Field of the Invention

The field of the invention is that of display devices projecting an image onto a semi-transparent screen. These devices allow an image to be displayed in front of the user in superposition on the external scene. One of the possible areas of use is the display of information in vehicles, more precisely in the cockpits of aircraft and, in particular, in the cockpits of aircrafts which have large window surface areas.

2. Description of the Prior Art

These display systems allow the attention of the user to be kept on the environment surrounding him/her, while at the same time giving him/her access instantaneously to additional information. In the case of the driving of a vehicle, having information displayed in the visual field of the external environment avoids the user having to search for this information on screens conventionally situated on his/her dashboard.

Various technical solutions exist allowing an image to be projected onto a semi-transparent screen. The most common solution is illustrated in FIG. 1. It consists in projecting the image produced by a projector P emitting in the visible spectrum onto the surface of a transparent scattering film E. The diffuser scatters the projected image towards the eye Y of the observer, while at the same time remaining relatively transparent and thus allowing the outside to be viewed. The compromise between transmission and scattering is not simple to find. Scattering films are dedicated to the projection of advertisements onto the display windows of stores. However, the technique is above all used at night, in other words under low ambient lighting conditions. In the daytime, this technique yields mediocre results. Indeed, as can be seen in FIG. 2, the film E scatters the sunlight S in all directions (straight banded arrows in FIG. 2). The transmission of the light is represented by a succession of chevrons in this figure. The film then appears milky, the transparency is limited, the efficiency in reflection and the brightness of the projected image remain low and basically unsatisfactory.

Accordingly, in the application FR 2 986 624 entitled "Optical projector with a semi-transparent projection screen", the applicant provides a display screen comprising a plurality of patterns scattering the light regularly distributed over a transparent surface, where these patterns can comprise a reflecting surface coating. With respect to the previous systems, the semi-transparent screen of this projector both possesses a high transparency and yields a high brightness of the projected image, while at the same time having a limited diffraction.

However, the light rays coming from the projector and scattered by the screen all have a known angle of incidence. In the same way, the illumination by sunlight can only come from certain directions, certain parts of the cockpit forming a natural mask. However, the previous screen is isotropic and does not take into account, in a precise manner, the variations in angle of incidence of the light rays coming from the projector in such a manner as to optimize the efficiencies of scattering towards the eye of the observer.

SUMMARY OF THE INVENTION

The screen according to the invention does not have these drawbacks. It comprises patterns oriented in such a manner as to to take into account the positions of the image projector and of the user so as to ensure an optimum diffusion of the light. In addition, the scattering by sunlight is minimized. More precisely, the aim of the invention is a display system comprising an image projector and an associated display screen, the said display system being designed to be used by an observer situated at a given location, the said display screen comprising two transparent and substantially parallel faces, the said display screen comprising, on at least one of its transparent faces, a plurality of regularly distributed patterns, characterized in that, since the image projector illuminates the screen under a plurality of angles of incidence determined by the position and the size of the display screen, the said angles of incidence being centered on a mean angle of incidence, the patterns comprise a diffractive structure in order to diffract the light rays having at least the mean angle of incidence in one or more directions corresponding to the said given location of the observer.

Advantageously, the diffraction parameters of each pattern are adapted to the angle of incidence of the light coming from the image projector and which illuminates the said pattern.

The image emitted by the image projector forms on or in the immediate vicinity of the surface of the display screen.

BRIEF DESCRIPTION OF THE DRAWINGS

The invention will be better understood and other advantages will become apparent upon reading the description that follows given by way of non-limiting example and by virtue of the appended figures amongst which.

DETAILED DESCRIPTION

The display system according to the invention comprises an image projector and an associated specific display screen. The image emitted by the image projector forms on or in the immediate vicinity of the surface of the display screen. This display screen comprises two transparent and substantially parallel faces. These faces are not necessarily plane and the screen according to the invention may be perfectly incorporated into a curved windscreen, for example.

In a large number of applications, and in particular when the display system is integrated into a cockpit or into an aircraft cabin, as has been said, the position of the projector with respect to the screen is perfectly determined and the eyes of the user occupy a given location which is referred to in some applications as an "eye box". In the same way, the sunlight can only come from certain directions, the cockpit introducing natural masks.

Figure 1:
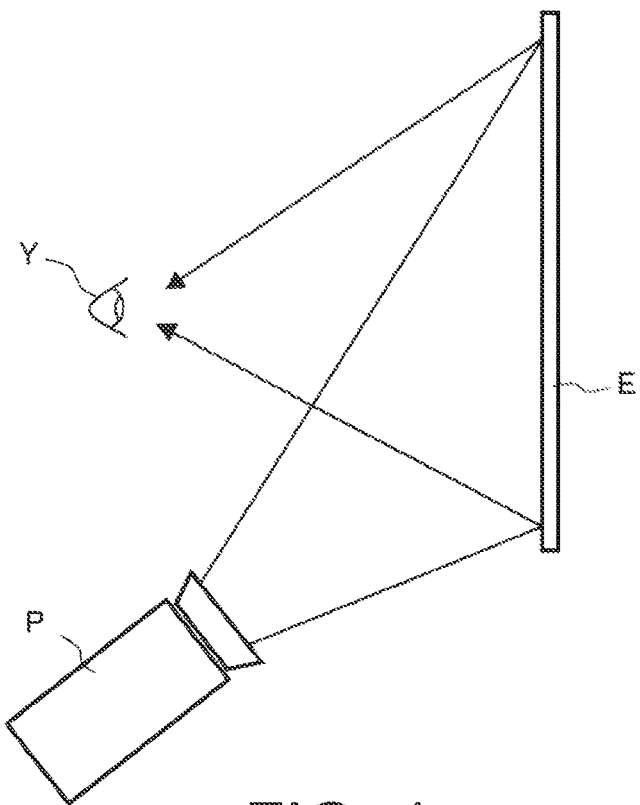
FIG. 1, already discussed, shows the synoptics of a display system with an image projector according to the prior art.
Figure 2:
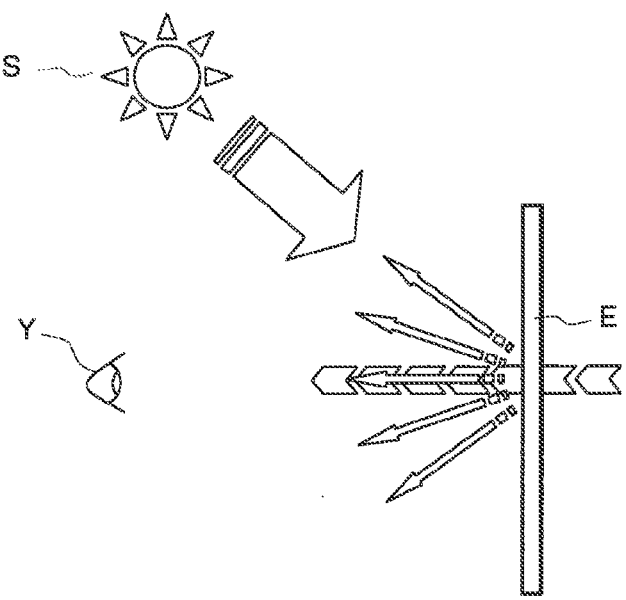
FIG. 2, already discussed, shows the scattering of sunlight on a display screen according to the prior art.
Figure 3:
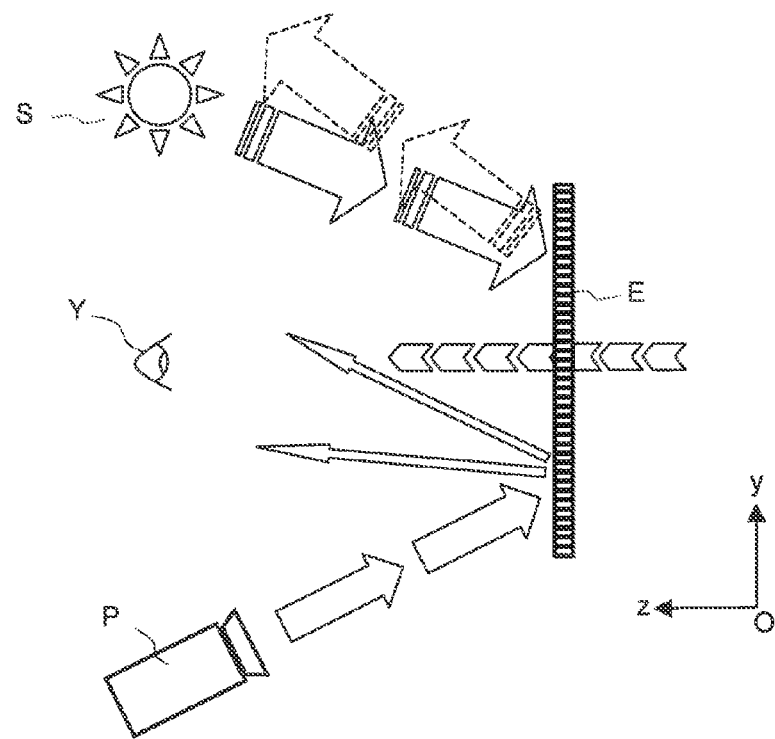
FIG. 3 shows a display system comprising a display screen according to the invention.

The screen according to the invention makes use of this property. By disposing a plurality of patterns diffracting the light regularly distributed over one of its transparent faces, the patterns may be arranged in such a manner that, since the image projector illuminates the screen under a plurality of angles of incidence determined by the position and the size of the display screen, the said angles of incidence being centered on a mean angle of incidence, the diffracting patterns are arranged so as to diffract the light rays having at least the mean angle of incidence in one or more directions corresponding to the said given location of the observer. More precisely, the patterns diffract the light in a very different manner depending on the angle of incidence. This property is illustrated in FIG. 3. The sun's rays are not scattered towards the eye of the observer whereas those coming from the projector are scattered. By way of example, the sun's rays can be back reflected by the patterns as indicated in FIG. 3.

Display screens may be differentiated into two main types. In the first type, all the patterns are strictly identical. In the second type, each pattern is a function of the mean angle of incidence on the pattern of the light rays coming from the projector.

Generally speaking, the dimensions of the patterns are of the order of a few tens of microns to a few hundreds of microns. The percentage of surface area of the screen occupied by the patterns determines the transmission factor of the display screen. Thus, if the patterns occupy 20% of the surface area of the screen, the transmission factor not including losses by glass surface reflections cannot exceed 80%. The formation of such patterns does not pose any particular fabrication problems. Indeed, these patterns have essentially a photometric role and do not require the precision of optical systems designed for imaging.

Figure 4:
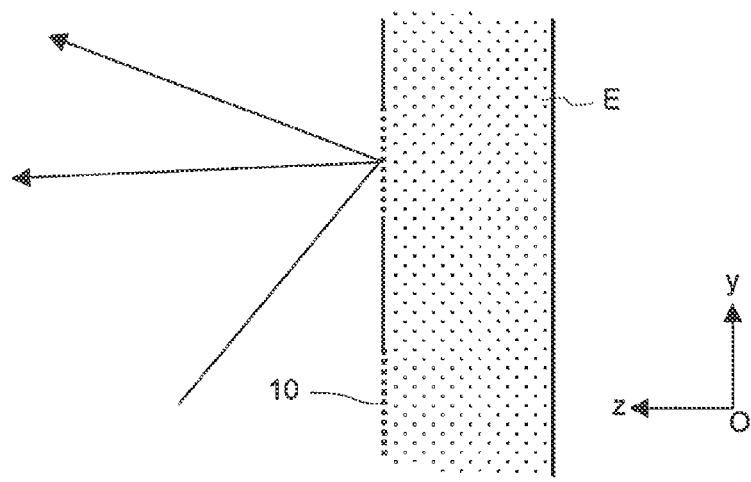
FIG. 4 shows a cross-sectional view of one embodiment of a display screen according to the invention.

By way of non-limiting example, FIG. 4 shows one embodiment of a display screen according to the invention. This figure is referenced to the same frame of reference (O, x, y, z) and shows a cross-sectional view of the display screen. The broken arrow in this cross-sectional view indicates the passage of a light ray coming from the projector inside of the pattern, the point of the arrow is directed towards the observer.

In said FIG. 4, each pattern 10 is a diffracting planar facet, located on one of the transparent faces of the screen. The properties of the diffracting texture covering the facet are adjusted so as to ensure almost uniform illumination in the eye box and almost zero illumination elsewhere.

Each facet comprises a set of identical microfacets. Two important parameters define these microfacets. These are:

the dimensions of each microfacet and more precisely the distance between each microfacet, which will define the diffraction directions as a function of a given direction of incidence; and the shape of each microfacet, which defines the diffraction efficiency in a given direction. Generally, the microfacets are inclined planar areas.

It is possible to optimize these two parameters so as to obtain very high efficiencies in the directions corresponding to those of the eye box. Each microfacet may be covered with a reflective treatment in order to increase its efficiency. The facets may also be matched to the emission spectra of the projector and particular spectral bands may also have facets dedicated to them.

What is claimed is:

1. A display system comprising an image projector and an associated display screen, the display system designed to be used by an observer situated at a given location, the display screen comprising two transparent and substantially parallel faces, the display screen comprising, on at least one of the transparent faces, a plurality of regularly distributed patterns, wherein, since the image projector illuminates the screen under a plurality of angles of incidence determined by a position and a size of the display screen, the plurality of angles of incidence being centered on a mean angle of incidence, a percentage of a surface area of the display screen occupied by the patterns does not exceed 20% of the surface area of the display screen, the patterns comprise a diffractive structure in order to diffract light rays having at least the mean angle of incidence in one or more directions corresponding to the given location of the observer.

2. The display system according to claim 1, wherein the diffraction parameters of each pattern are adapted to the angle of incidence of the light rays coming from the image projector and which illuminates the pattern.

3. The display system according to claim 1, wherein dimensions of the patterns are of an order of a few tens of microns to a few hundreds of microns.

4. The display system according to claim 1, wherein each pattern is a diffractive planar facet comprising a set of identical microfacets.

5. The display system according to claim 4, wherein each microfacet is an inclined planar area.

* * * * *